(12) United States Patent
Tsai et al.

(10) Patent No.: US 7,540,630 B2
(45) Date of Patent: Jun. 2, 2009

(54) BACKLIGHT MODULE AND SCATTERING MODULE FOR SAME

(75) Inventors: Shau-Yu Tsai, Hsinchu (TW); Yu-Chuan Lin, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 12/119,660

(22) Filed: May 13, 2008

(65) Prior Publication Data
US 2009/0052174 A1    Feb. 26, 2009

(30) Foreign Application Priority Data
Aug. 20, 2007    (TW) .............................. 96130752 A (51) Int. Cl.
*F21V 33/00* (2006.01)
(52) U.S. Cl. ................. 362/246; 362/240; 362/244
(58) Field of Classification Search ................. 362/235, 362/236, 237, 240, 241, 244, 245, 246, 247, 362/800
See application file for complete search history.

(56) References Cited

U.S. PATENT DOCUMENTS

| | | | |
|---|---|---|---|
| 4,975,814 A * | 12/1990 | Schairer | 362/240 |
| 6,883,933 B2 * | 4/2005 | Matsui et al. | 362/231 |
| 7,152,988 B2 | 12/2006 | Hung | |
| 7,185,995 B2 | 3/2007 | Hatanaka et al. | |
| 2002/0085379 A1 * | 7/2002 | Han et al. | 362/227 |
| 2006/0012993 A1 * | 1/2006 | Ohkawa | 362/240 |

* cited by examiner

*Primary Examiner*—Laura Tso
(74) *Attorney, Agent, or Firm*—Thomas, Kayden, Horstemeyer & Risley (57) ABSTRACT

A scattering module and a backlight module comprising the scattering module are provided. The backlight module includes a plurality of light sources, while the scattering module includes a plurality of scattering elements. The scattering elements are disposed correspondingly to the light sources so that the scattering elements have different linearly arranged densities in different directions. Thereby, the light generated from the backlight module would be projected onto the display panel evenly with a uniform brightness.

20 Claims, 9 Drawing Sheets

BACKLIGHT MODULE AND SCATTERING MODULE FOR SAME

This application claims priority to Taiwan Patent Application No. 096130752 filed on Aug. 20, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a scattering module and a backlight module comprising the same and more particularly, the present invention relates to a scattering module structure capable of rendering the brightness of a backlight module more uniform without incurring a non uniform distribution of brightness on a display panel.

2. Descriptions of the Related Art

Liquid crystal displays (LCDs) are full color display devices that utilize the liquid crystal technology with advantages such as low power consumption, low radiation, small footprints, is lightweight and is flexible in size. Therefore, LCDs have been used in many electronic products that incorporate display screens, such as digital cameras, personal digital assistants (PDAS) and TV sets. LCDs differ from conventional cathode ray tube (CRT) display devices in that the liquid crystal layer of an LCD does not emit light by itself. As a result, an additional light source is needed to obtain an image on the screen. Generally, the additional light source is known as a backlight module.

Backlight modules fall into two categories according to the location of the light sources disposed therein: the edge lighting type and the direct lighting type. Generally, direct lighting light sources are the most commonly used type in large-sized backlight modules. The direct lighting type backlight module comprises a plurality of light source devices and a set of optical films. The light emitted from the light source devices is modulated via the optical films and then propagated to a color filter for display on a display panel. Generally, the set of optical films includes one or more layers of brightness enhancement films (BEFs), a diffuser sheet, a diffuser plate and a reflector. A plurality of dot patterns are arranged beneath the diffuser plate, so that when light impinges on the dot patterns, a portion of the light will be transmitted through the dot patterns while the remaining portion is reflected off the dot patterns. By reflecting a portion of the light, an increased number of reflections will occur between the diffuser plate and the back plate. By transmitting the other portion of the light, a dark band prevented from forming above the dot patterns. As a result, a more uniform emergent light beam and thereby an improved overall performance of the backlight module are obtained.

Figure 1:
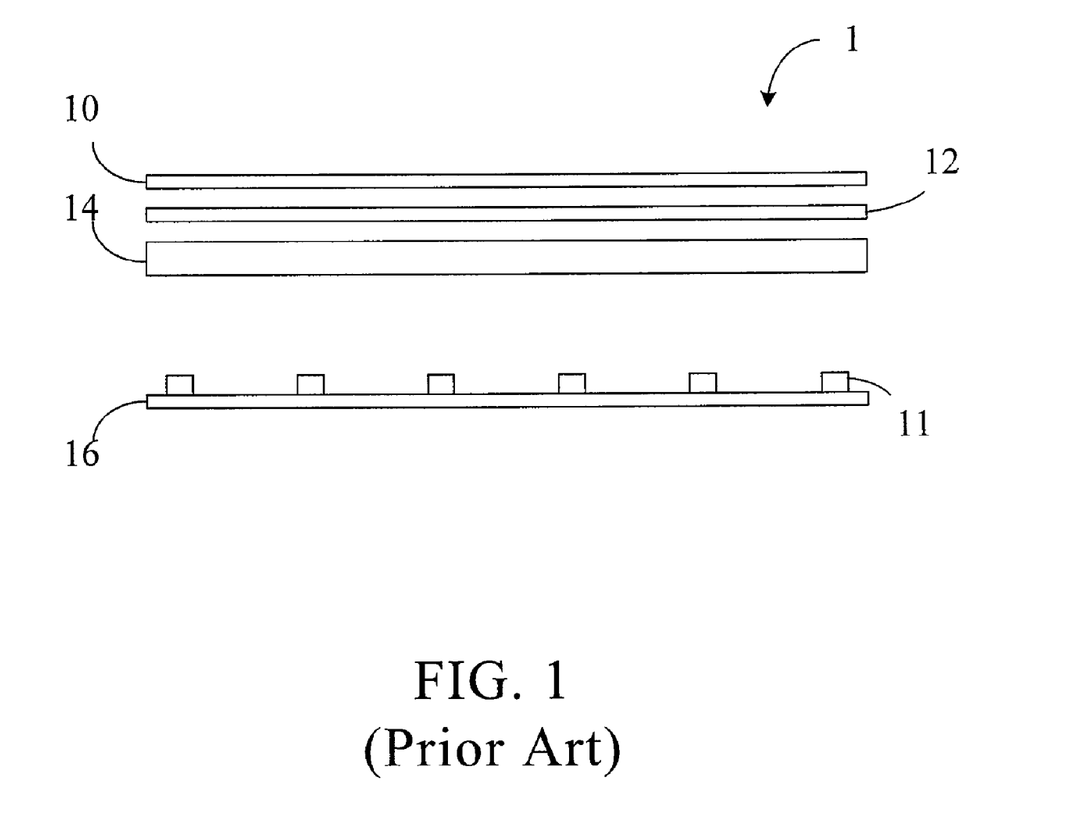
FIG. 1 is a schematic view of a backlight module of the prior art.
Figure 2:
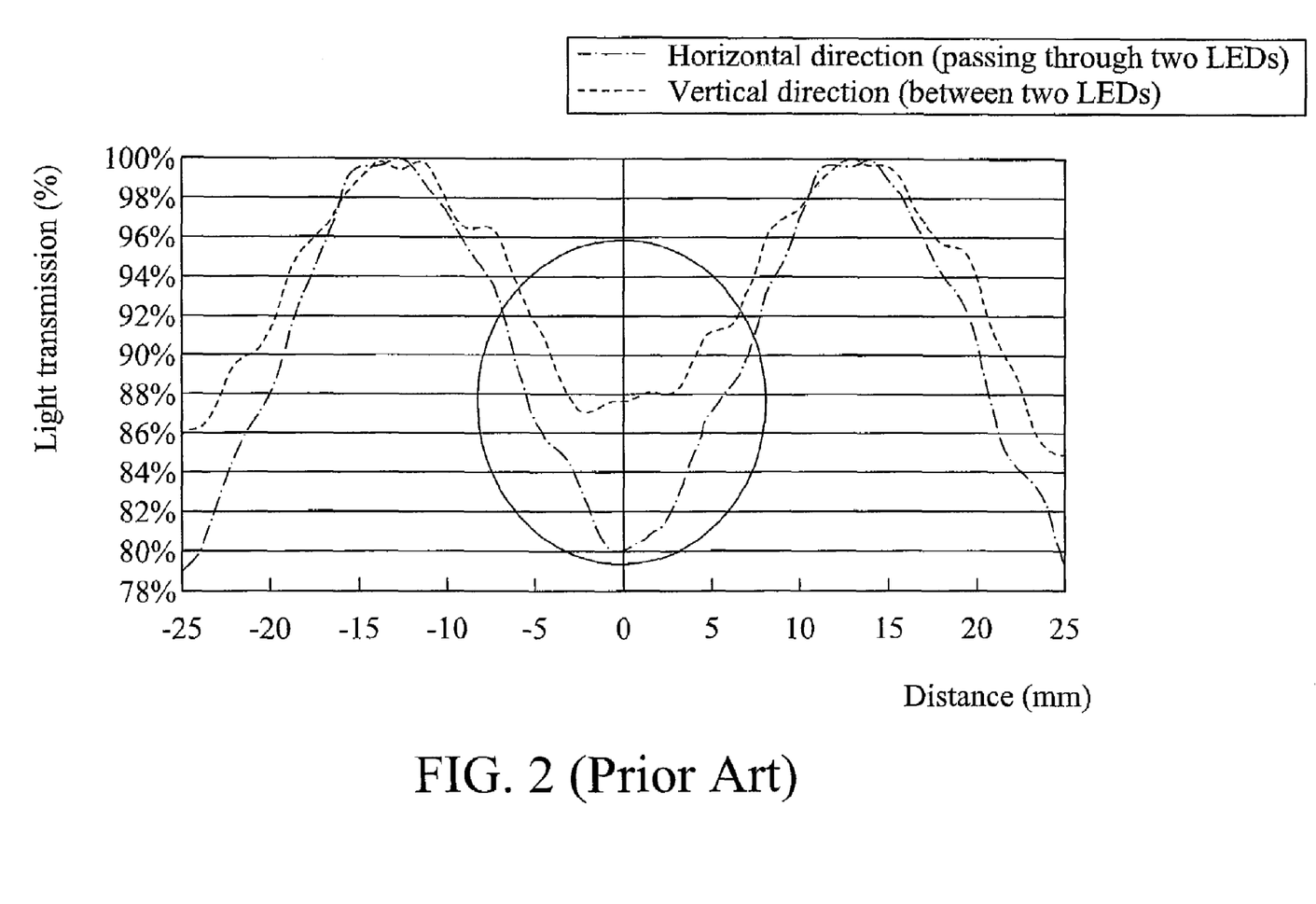
FIG. 2 depicts the simulation plot of the light transmission in the backlight module of FIG. 1.

As shown in a cross-sectional view of FIG. 1, a prior art backlight module 1 comprises a set of optical films and a plurality of light sources 11. The set of optical films includes, from top to bottom, a BEF 10, a diffuser sheet 12, a diffuser plate 14 and a reflector 16. The plurality of light sources 11 are disposed on the reflector 16. The light sources may be light emitting diodes (LEDs). Since light emitted from a light source 11 is concentrated in the very front of the light source 11, if the brightness of the light transmitted through the diffuser plate 14 is not uniform, alternate latticed dark and bright streaks or even latticed dark and bright dots tend to arise on the display panel between the individual light sources. FIG. 2 depicts the simulation results of a brightness distribution on a display panel incorporating the backlight module 1. The dark areas as indicated by the ellipse are shown between the individual LED light sources in the display panel. Furthermore, among the current backlight modules of a direct lighting structure, there is a decreased number of light sources as an effort to reduce the cost. In this case, the latticed dark streaks will become more obvious.

Figure 3:
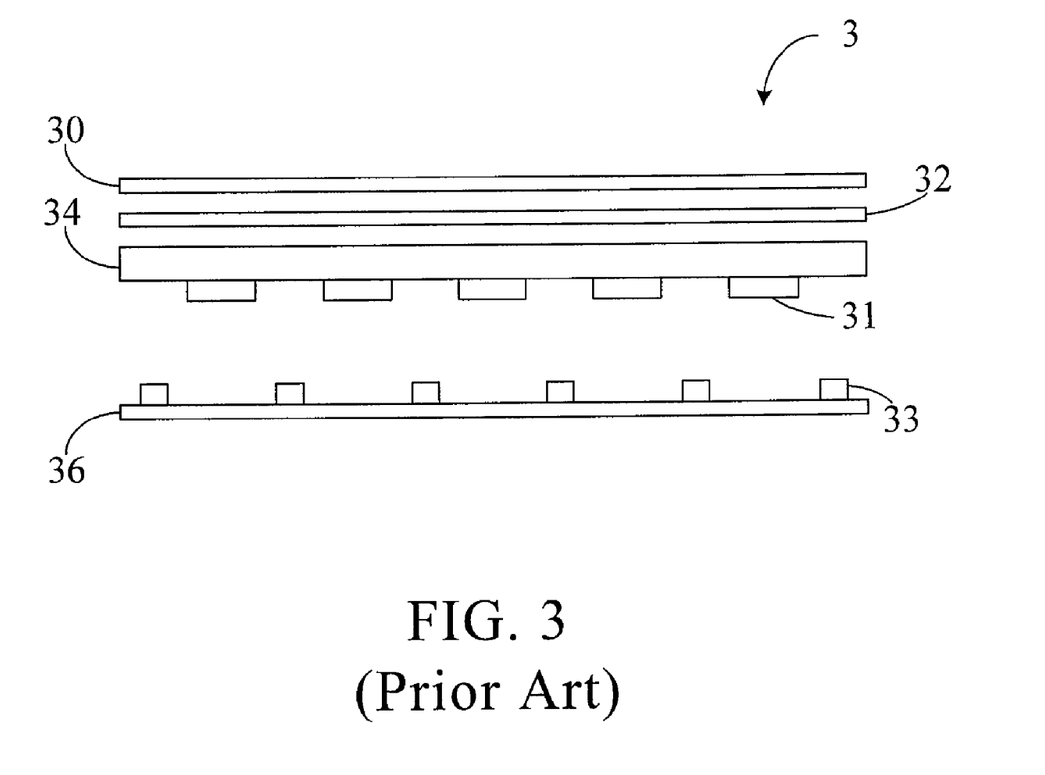
FIG. 3 is a schematic view of another backlight module of the prior art.
Figure 4:
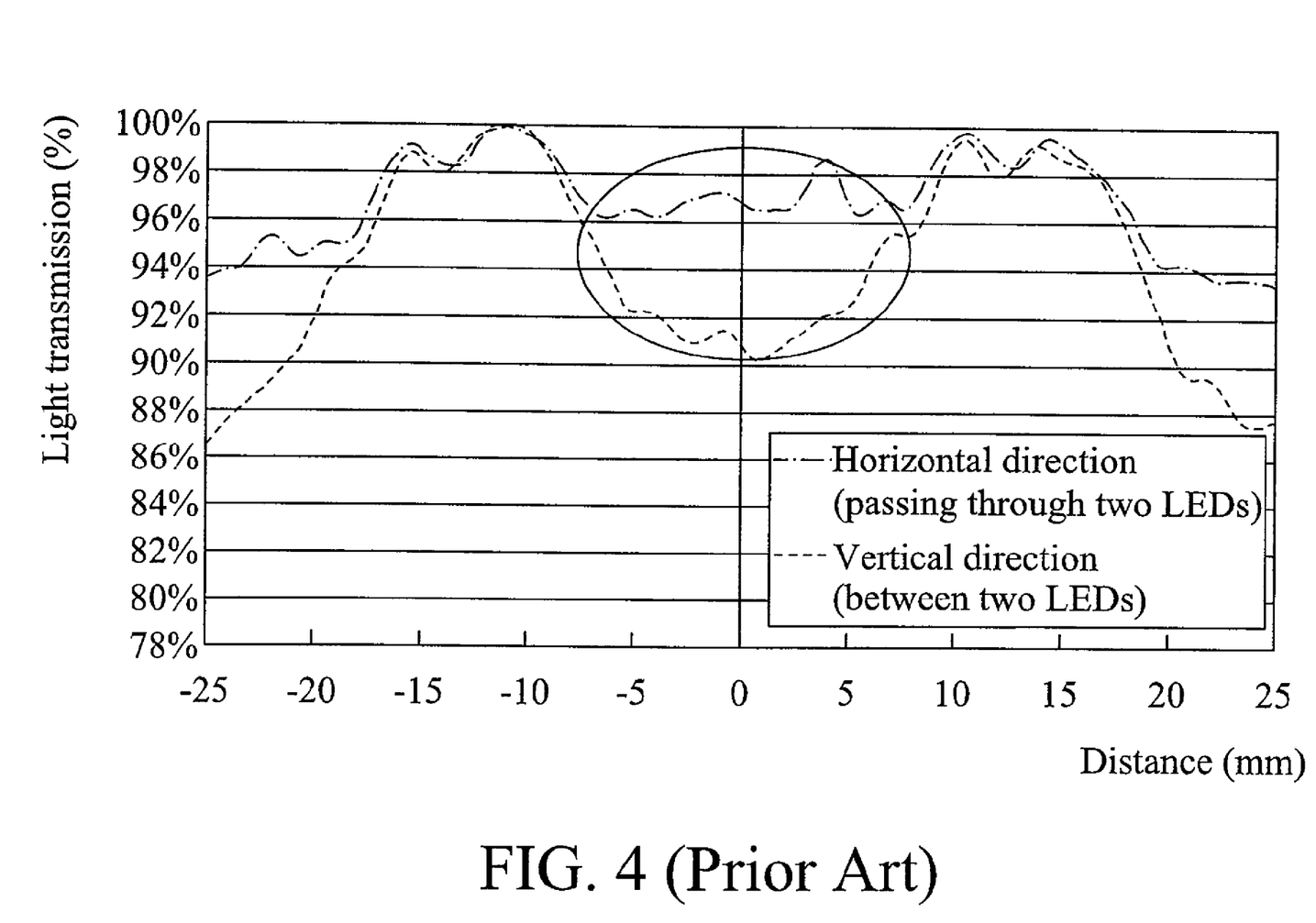
FIG. 4 depicts the simulation plot of the light transmission in the backlight module of FIG. 3.

To mitigate the latticed dark streaks, a backlight module shown in FIG. 3 has been proposed. As seen in the cross-sectional view of FIG. 3, in order for the light emitted from the light sources to be diffused uniformly, the backlight module 3 has additional dot patterns at the bottom of the diffuser sheet. Accordingly, the set of optical films in the backlight module 3 includes a BEF 30, a diffuser sheet 32, a diffuser plate 34, a plurality of dot patterns 31 and a reflector 36. A plurality of light sources 33 (e.g., LEDs) are disposed on the reflector 36, while the dot patterns 31 are disposed on the bottom surface of the diffuser plate 34. More specifically, the plurality of dot patterns 31 are centered around a point where the light emitting center of the light sources 33 is projected on the diffuser plate 34. By adjusting the size of the individual dot patterns 31 and spacing therebetween in such a way that the linearly density of the dot patterns 31 decreases as the dot patterns 31 are located further away from the central point, the brightness of the light sources 33 is redistributed through the diffusion of the dot patterns 31, thus mitigating the latticed dark streaks arising from a non uniform brightness distribution of the light sources. However, in such a prior art structure, the dot pattern arrangement only takes into account the relative relationships between the individual light sources arranged along the same horizontal or vertical axis, but ignores the fact that the maximum distance between the individual light sources exists in the diagonal direction, thus causing a larger linearly density along the horizontal or vertical axis than that along the diagonal direction. Consequently, when the spacing between the light sources and the interval between the light sources and the diffuser plates are enlarged to a certain extent, the dark areas still arose between the light sources. For example, if LED light sources are used and the spacing between the light sources are enlarged to 26-27 mm while the interval between the LED light sources and the diffuser plates is enlarged to 20 mm, a light transmission plot as shown in FIG. 4 is obtained through an experiment and simulation results. It can be seen from this plot that, although the arrangement of the dot patterns mitigates latticed dark streaks, dark areas still arose between four the LED light sources (as shown by the ellipse).

Accordingly, it is important to provide a new dot pattern arrangement with such a linearly density so that the brightness of the light sources are distributed uniformly in the display panel.

SUMMARY OF THE INVENTION

One objective of this invention is to provide a scattering module adapted for a backlight module. The backlight module includes a plurality of light sources. The light sources are located on a side of the scattering module, and include a first light source, a second light source and a third light source. The second light source is arranged along a first direction of the first light source with a first spacing formed therebetween. The third light source is arranged along a second direction of the first light source with a second spacing formed therebetween. The first spacing is smaller than the second spacing, while the first direction is different from but is substantially not perpendicular to the second direction. The scattering module of this invention comprises a plurality of scattering elements. The scattering elements present a first linearly arranged density in the first direction and a second linearly arranged density in the second direction, with the first linearly arranged density is smaller than the second linearly arranged density. In this way, the light from the backlight module is projected to the display panel uniformly without incurring a non uniform brightness distribution.

Another objective of this invention is to provide a backlight module, which comprises a plurality of light sources and the aforesaid scattering module. The light sources are disposed on a side of the scattering module and include a first light source, a second light source and a third light source. The second light source is arranged along a first direction of the first light source with a first spacing formed therebetween. The third light source is arranged along a second direction of the first light source with a second spacing formed therebetween. The first spacing is smaller than the second spacing, while the first direction is different from but is substantially not perpendicular to the second direction. The scattering module comprises a plurality of the scattering elements, which present a first linearly arranged density and a second linearly arranged density in directions parallel to the first direction and the second direction respectively, with the first linearly arranged density smaller than the second linearly arranged density. In this way, the light from the backlight module is projected onto the display panel uniformly without incurring a non uniform brightness distribution.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 5:
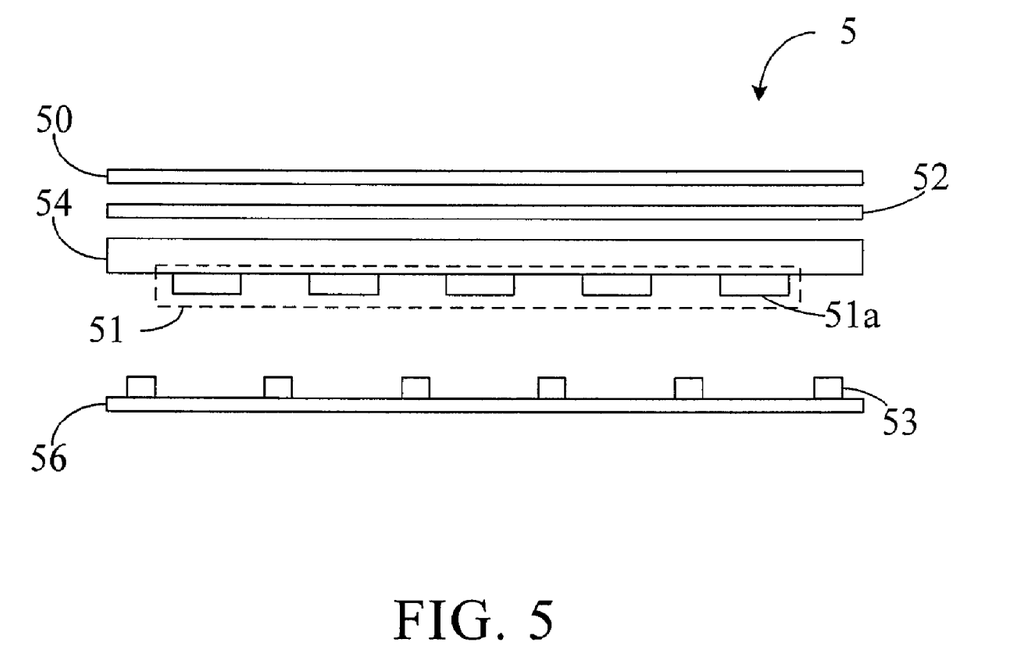
FIG. 5 is a cross-sectional view of a backlight module in accordance with the first embodiment of this invention.

The first embodiment of this invention is a backlight module 5, of which a cross-sectional view is depicted in FIG. 5. The backlight module 5 comprises a brightness enhancement film (BEF) 50, a diffuser sheet (DS) 52, a diffuser plate (DP) 54, a scattering module 51, a plurality of light sources 53 and a reflector 56 from top to bottom in FIG. 5. The scattering module 51 further comprises a plurality of scattering elements. In this embodiment, these scattering elements are a plurality of dot patterns 51a disposed on the bottom surface of the diffuser plate 54. The plurality of light sources 53 are light emitting diodes (LEDs) disposed on the reflector 56 facing towards the scattering elements. In other words, the plurality of light sources 53 are disposed on a side of the scattering module 51.

Figure 6:
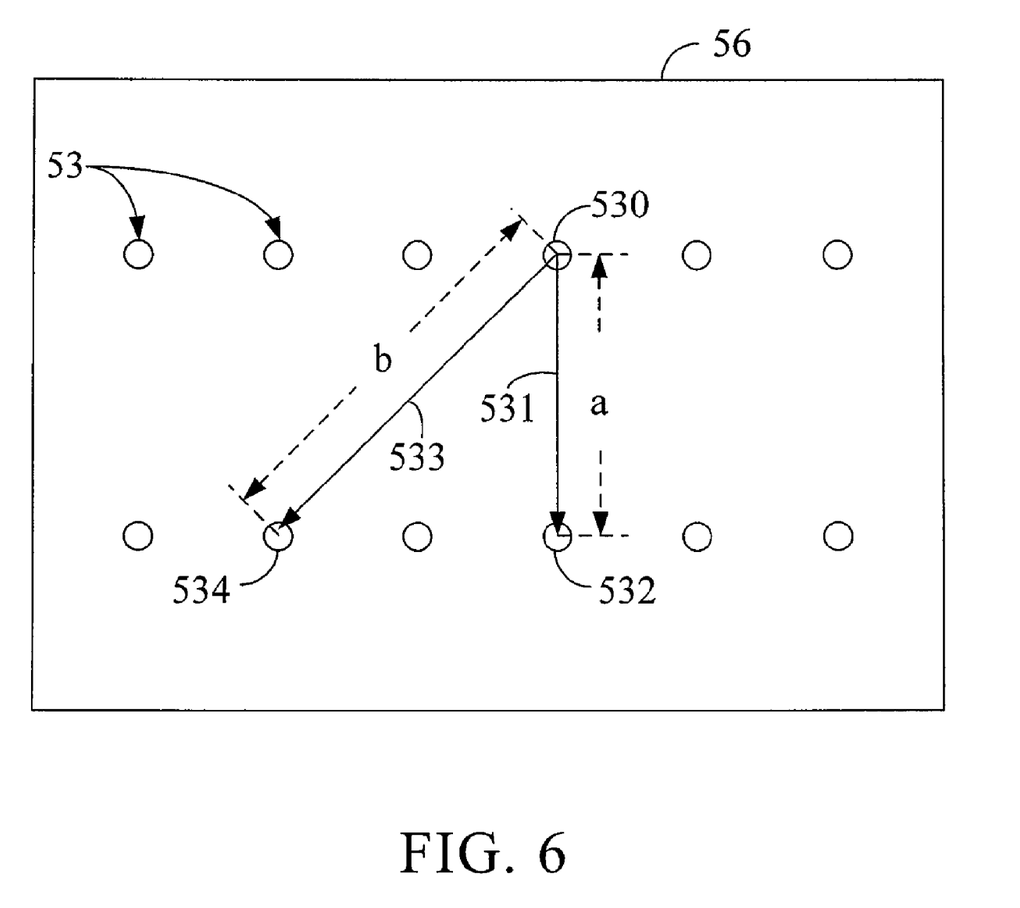
FIG. 6 is a top view showing the relative positions of the light sources on a reflector in the backlight module in accordance with the first embodiment of this invention.

The top view of the reflector 56 and the light sources 53 in the backlight module 5 is depicted in FIG. 6. The plurality of light sources 53 include a first light source 530, a second light source 532 and a third light source 534. The second light source 532 is arranged along a first direction 531 of the first light source 530, with a first spacing a defined therebetween. The third light source 534 is arranged along a second direction 533 of the first light source 530, with a second spacing b defined therebetween. It should be noted that the first direction 531 is different from and is substantially not perpendicular to the second direction 533. In this embodiment, the first direction 531 is in a vertical direction while the second direction 533 is in a diagonal direction, so that the first spacing a is smaller than the second spacing b. In other embodiments, the first direction 531 may be in the horizontal direction instead, which is not depicted in the drawings but can be imagined by those skilled in the art.

Figure 7:
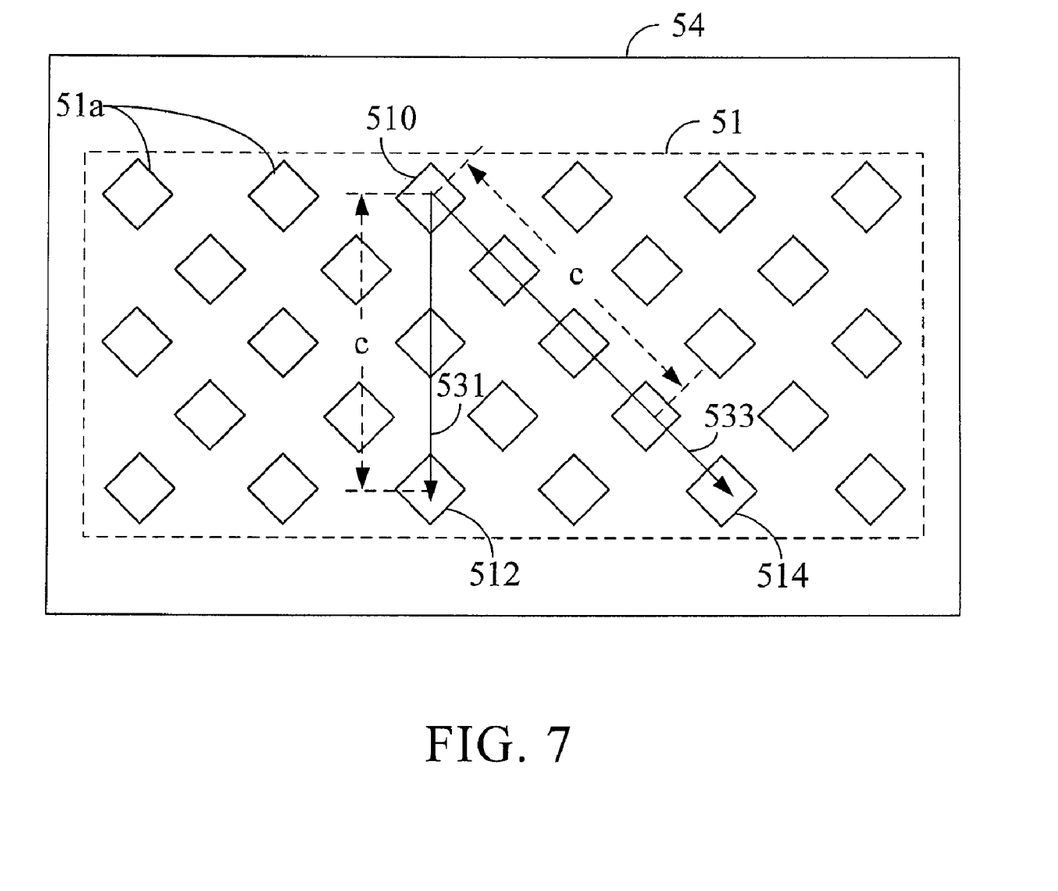
FIG. 7 is a bottom view showing the relative positions of the dot patterns on a diffuser plate in the backlight module in accordance with the first embodiment of this invention.

A bottom view of the diffuser plate 54 and the dot patterns 51 in the backlight module 5 are depicted in FIG. 7. The plurality of dot patterns 51 include a first dot pattern 510, a second dot pattern 512 and a third dot pattern 514. In this embodiment, these dot patterns 510, 512, 514 all have an equal area and the same profile. When viewed from a direction parallel to the first direction 531, the dot patterns 510, 512, 514 are all in a lozenge form. The first dot pattern 510, the second dot pattern 512 and the third dot pattern 514 correspond to the first light source 530, the second light source 532 and the third light source 534 respectively. The line connecting the first dot pattern 510 and the second dot pattern 512 is parallel to the first direction 531. The dot patterns located along this line have a first linearly arranged density. A line connecting the first dot pattern 512 and third dot pattern 514 is parallel to the second direction 533. The dot patterns located along this line have a second linearly arranged density. Here, the first and second linearly arranged densities are each defined as a length occupied by the dot patterns in a unit length c along the first direction 531 and the second direction 533 respectively. The dot patterns located in a unit length c along the first direction 531 present a first total area, and those located in the unit length c along the second direction 533 present a second total area which is larger than the first total area. Since each individual dot pattern has the same area, it can be inferred that the first linearly arranged density along the first direction 531 is smaller than the second linearly arranged density along the second direction 533. Consequently, because the larger dot pattern area is arranged along the second direction 533, the light emitted from the light sources 530, 532, 534 may be diffused in a more effective way and distributed more uniformly on the display panel.

Figure 8:
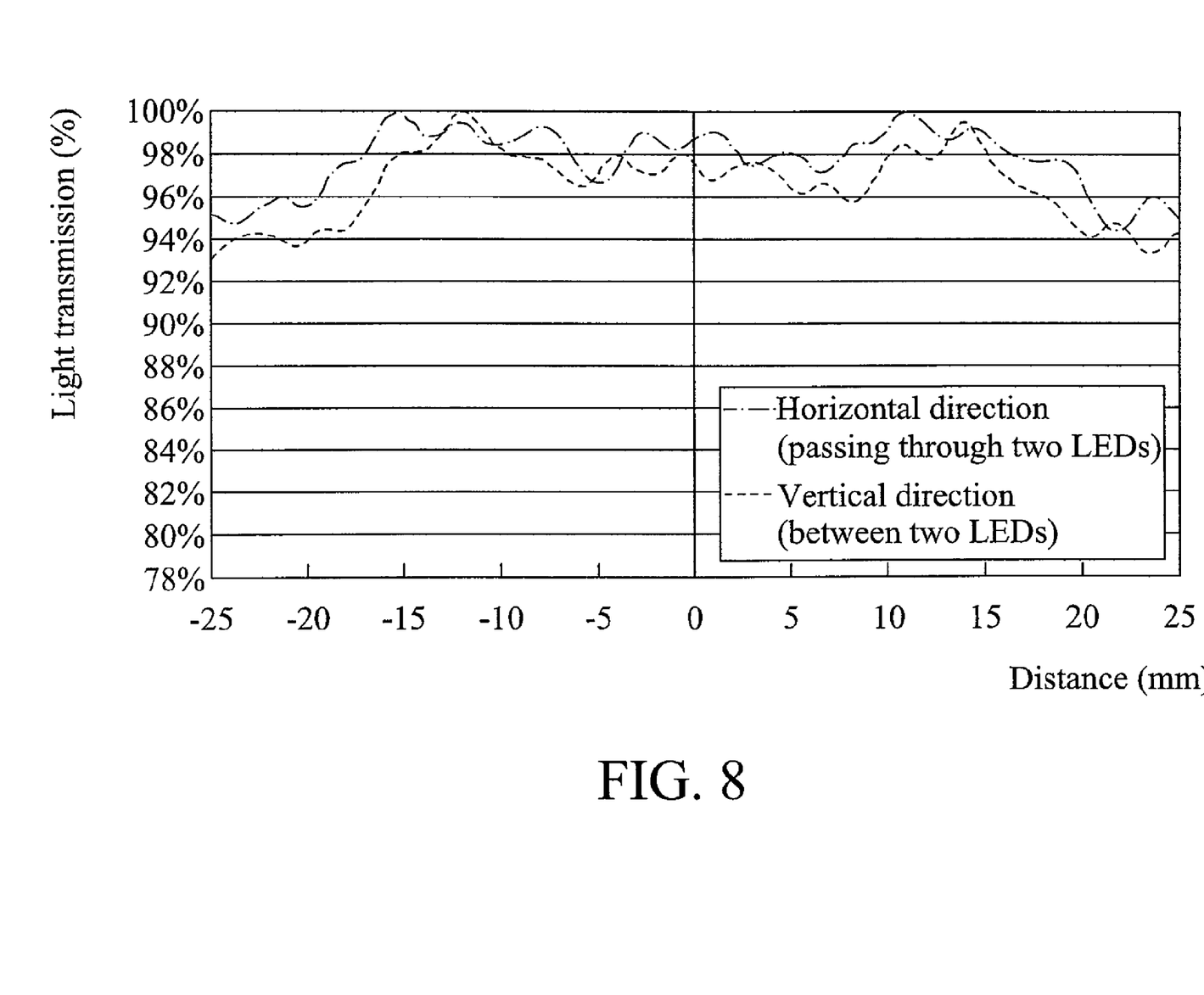
FIG. 8 depicts the simulation plot of the light transmission in the backlight module in accordance with the first embodiment of this invention.

The simulation plot of the light transmission presented by the display panel of a display apparatus adopting such a backlight module is depicted in FIG. 8. As can be seen, the different dot pattern arrangement of this embodiment results in an increased linearly arranged density of dot patterns along the diagonal direction, thus preventing a non uniform brightness. Therefore, even if the spacing between individual light sources is enlarged, uniform light can still be provided to the display panel of the display apparatus adopting such a backlight module.

In reference to FIG. 7, when viewed from the first direction 531, the first dot pattern 510 and the second dot pattern 512 may be considered as the arrangement of the lozenge dot pattern along the first direction 531. However, when viewed from the second direction 533, the first dot pattern 510 and the third dot pattern 514 may be considered as the arrangement of the square dot pattern. The different arrangement of the dot patterns in the different directions results in an increased linearly arranged density of the dot patterns along the second direction 533, so that the first linearly arranged density of the lozenge dot patterns along the first direction 531 is smaller than the second linearly arranged density of the square dot patterns along the second direction 533. As a consequence, uniform light, obviating the brightness with a non uniform distribution is obtained.

In other preferred examples of the first embodiment, the dot patterns may vary in area according to the distance to the light sources. For example, the area of the dot patterns may be designed in such a way that the further the dot pattern is located from a light source, the smaller the area thereof will be. In this case, the dot patterns located midway between the two light sources will have the minimum area. On the other hand, the light sources are not merely limited to the arrangement in an array form, and examples with other arrangement or random distribution forms may readily occur to those skilled in the art.

Figure 9:
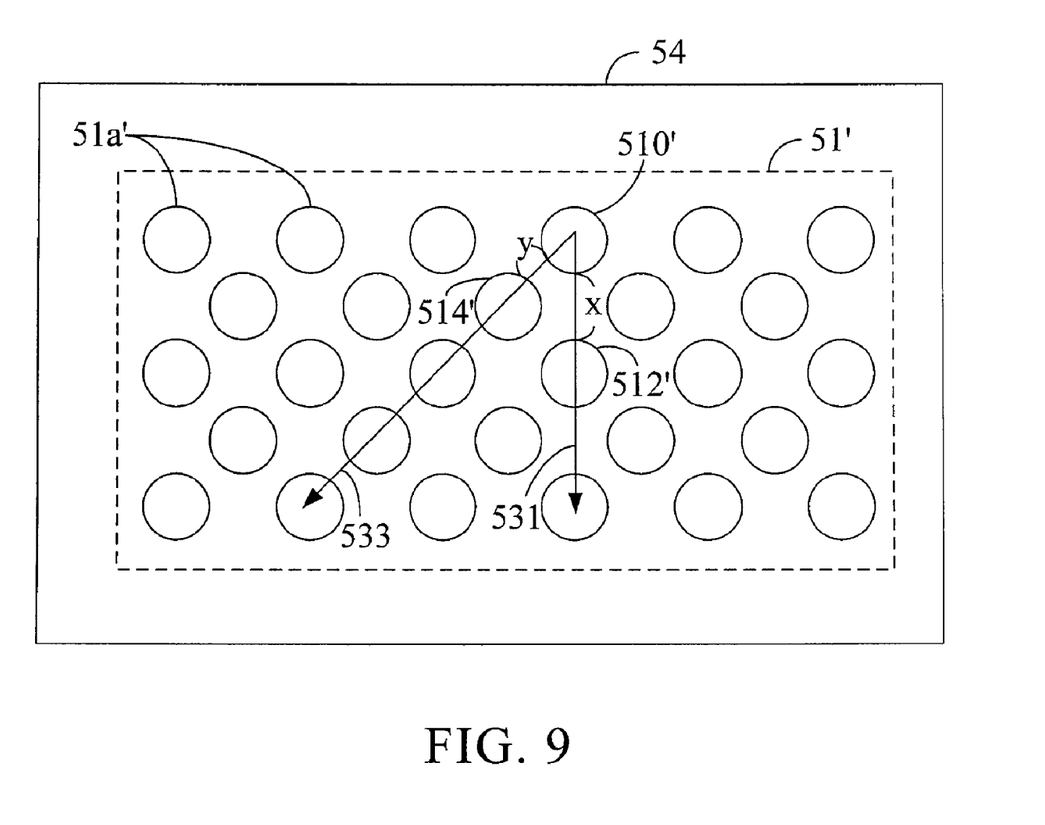
FIG. 9 is a bottom view showing the relative positions of the dot patterns on a diffuser plate in a backlight module in accordance with the second embodiment of this invention.

The second embodiment of this invention is also a backlight module. The scattering module 51' of this backlight module comprises scattering elements different from those in the previous embodiments. FIG. 9 depicts the bottom view of a diffusion plate 54 and the scattering elements 51a' of this backlight module. As shown, the scattering elements 51a' of the scattering module 51' all have an equal area and a circular shape. The scattering elements includes a first dot pattern 510', a second dot pattern 512' and a third dot pattern 514', which correspond to a first light source 530, a second light source 532 and a third light source 534 respectively. The line connecting the first dot pattern 510' and the second dot pattern 512' is parallel to a first direction 531, with two adjacent dot patterns along the first direction 531 with a first distance x, i.e., the first dot pattern 510' and the second dot pattern 512' has the first distance x. The line connecting the first dot pattern 510' and the third dot pattern 514' is parallel to a second direction 533, with two adjacent dot patterns along the second direction 533 with a second distance y, i.e., the first dot pattern 510' and the third dot pattern 514' has the first distance y. Since the first distance x is greater than the second distance y, the light emitted from the light sources in the second direction 533 will be effectively diffused due to the more closely arranged dot patterns. As a consequence, the light becomes uniform and further obviates brightness with a non uniform distribution.

In the other preferred examples of the second embodiment, the dot patterns may vary in area according to the distance to the light sources. For example, the area of the dot patterns may be designed in such a way that the further the dot pattern is located from a light source, the smaller the area thereof will be. In this case, the dot patterns located in the midway between the two light sources will have the minimum area. On the other hand, the light sources are not merely limited to the arrangement in an array form. Examples with other arrangement or random distribution forms may readily occur to those skilled in the art.

In conclusion, this invention provides a larger linearly arranged density in the diagonal direction than those in the horizontal or vertical direction, thereby enhancing the light diffusion effect in the diagonal direction presenting a longer distance and rendering the light distribution more uniform. With this invention, even when the number of the light sources is reduced and the interval between light sources is increased due to cost, the brightness can be more uniform despite the inadequate reducing reflection arising from the low linearly arranged density of the dot patterns resulting in the brightness with a non uniform distribution.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A scattering module adapted for a backlight module, the backlight module including a plurality of light sources, the light sources being located on a side of the scattering module and including a first light source, a second light source and a third light source, the second light source arranged along a first direction of the first light source and a first spacing being formed therebetween, the third light source arranged along a second direction of the first light source and a second spacing being formed therebetween, wherein the first spacing is smaller than the second spacing, the first direction is different from the second direction, and the scattering module comprises:

a plurality of scattering elements, wherein the scattering elements constitute a first linearly arranged density in the first direction and a second linearly arranged density in the second direction, and the first linearly arranged density is smaller than the second linearly arranged density.

2. The scattering module as claimed in claim 1, wherein the first direction is substantially not perpendicular to the second direction.

3. The scattering module as claimed in claim 1, wherein the first linearly arranged density and the second linearly arranged density are lengths of the plurality of scattering elements occupied in a unit length in the first direction and the second direction.

4. The scattering module as claimed in claim 1, wherein the scattering elements arranged along the first direction in the unit length have a first total area, the scattering elements arranged along the second direction in the unit length have a second total area, and the first total area is smaller than the second total area.

5. The scattering module as claimed in claim 1, wherein each of the scattering elements arranged along the first direction has a first shape, each of the scattering elements arranged along the second direction has a second shape, and the first shape is different from the second shape.

6. The scattering module as claimed in claim 1, wherein the scatting elements arranged along the first direction form a first distance, the scattering elements arranged along the second direction form a second distance, and the first distance is greater than the second distance.

7. The scattering module as claimed in claim 1, wherein the scatting elements are a plurality of dot patterns.

8. The scattering module as claimed in claim 1, wherein the backlight module further comprises a reflector, and the light sources are disposed above the reflector.

9. The scattering module as claimed in claim 1, wherein the backlight module further comprises a diffuser plate, and the scattering elements are disposed above the diffuser plate.

10. The scattering module as claimed in claim 9, wherein the backlight module further comprises a brightness enhancement film (BEF), disposed above the diffuser plate.

11. A backlight module, comprising:
- a plurality of light sources including;
  - a first light source;
  - a second light source, arranged along a first direction of the first light source and forming a first spacing therebetween;
  - a third light source, arranged along a second direction of the first light source and forming a second spacing therebetween,
  - wherein the first spacing is smaller than the second spacing, and the first direction is different from the second direction, and
- a plurality of the scattering elements, being located on a side of the light sources, wherein the scattering elements parallel to the first direction and the second direction constitute a first linearly arranged density and a second linearly arranged density respectively, and the first linearly arranged density is smaller than the second linearly arranged density.

12. The backlight module as claimed in claim 11, wherein the first direction is substantially not perpendicular to the second direction.

13. The backlight module as claimed in claim 11, wherein the first linearly arranged density and the second linearly arranged density are lengths of the plurality of scattering elements occupied in a unit length in the first direction and the second direction.

14. The backlight module as claimed in claim 11, wherein the scattering elements arranged along the first direction in the unit length have a first total area, the scattering elements arranged along the second direction in the unit length have a second total area, and the first total area is smaller than the second total area.

15. The backlight module as claimed in claim 11, wherein each of the scattering elements arranged along the first direction has a first shape, each of the scattering elements arranged along the second direction has a second shape, and the first shape is different from the second shape.

16. The backlight module as claimed in claim 11, wherein the scatting elements arranged along the first direction form a first distance, the scattering elements arranged along the second direction form a second distance, and the first distance is greater than the second distance.

17. The backlight module as claimed in claim 11, wherein the scatting elements are a plurality of dot patterns.

18. The backlight module as claimed in claim 11, wherein the backlight module further comprises a reflector, and the light sources are disposed above the reflector.

19. The backlight module as claimed in claim 11, wherein the backlight module further comprises a diffuser plate, and the scattering elements are disposed above the diffuser plate.

20. The backlight module as claimed in claim 19, wherein the backlight module further comprises a brightness enhancement film (BEF), disposed above the diffuser plate.

* * * * *